United States Patent [19]
Nagai et al.

[11] Patent Number: 5,796,187
[45] Date of Patent: Aug. 18, 1998

[54] ELECTRIC ACTUATOR

[75] Inventors: Shigekazu Nagai; Shuuzou Sakurai; Masayuki Nakamura, all of Ibaraki-ken, Japan

[73] Assignee: SMC Kabushiki Kaisha, Tokyo, Japan

[21] Appl. No.: 855,448

[22] Filed: May 13, 1997

[30] Foreign Application Priority Data

Jun. 7, 1996 [JP] Japan .................... 8-146266

[51] Int. Cl.$^6$ ............................... H02K 7/06
[52] U.S. Cl. ............................... 310/20; 310/80
[58] Field of Search ................ 310/20, 37, 75 R, 310/80; 318/115

[56] References Cited

U.S. PATENT DOCUMENTS

| | | | |
|---|---|---|---|
| 3,682,283 | 8/1972 | Sato | 192/141 |
| 4,403,389 | 9/1983 | Coope | 29/561 |
| 4,710,660 | 12/1987 | McKee et al. | 310/178 |
| 4,734,605 | 3/1988 | Hayashi | 310/80 |
| 4,739,669 | 4/1988 | Yokose et al. | 74/89.15 |
| 5,099,161 | 3/1992 | Wolfbauer, III | 310/80 |

FOREIGN PATENT DOCUMENTS

| | | |
|---|---|---|
| 0 601 185 | 6/1994 | European Pat. Off. . |
| 0 726 118 | 8/1996 | European Pat. Off. . |
| 0 767 526 | 4/1997 | European Pat. Off. . |
| 35 05 842 | 8/1985 | Germany . |

Primary Examiner—Thomas M. Dougherty
Assistant Examiner—Judson H. Jones
Attorney, Agent, or Firm—Oblon, Spivak, McClelland, Maier & Neustadt, P.C.

[57] ABSTRACT

Disclosed is an electric actuator which makes it possible to prevent a driving force-transmitting shaft from adhesion of dust or the like, and eliminate any fear for deterioration of driving force-transmitting function. A hole is defined in a body which is arranged to extend in a vertical direction. A motor is secured to one end of the body. A feed screw is coaxially connected to a rotary shaft of the motor. The feed screw is rotatably supported by angular contact ball bearings. A feed nut is engaged with the feed screw. The hole is slidably engaged with a cylinder member which is formed to be cylindrical and lengthy. The cylinder member surrounds the feed screw. The feed nut is secured to one end of the cylinder member, and a bracket is secured to the other end thereof.

14 Claims, 3 Drawing Sheets

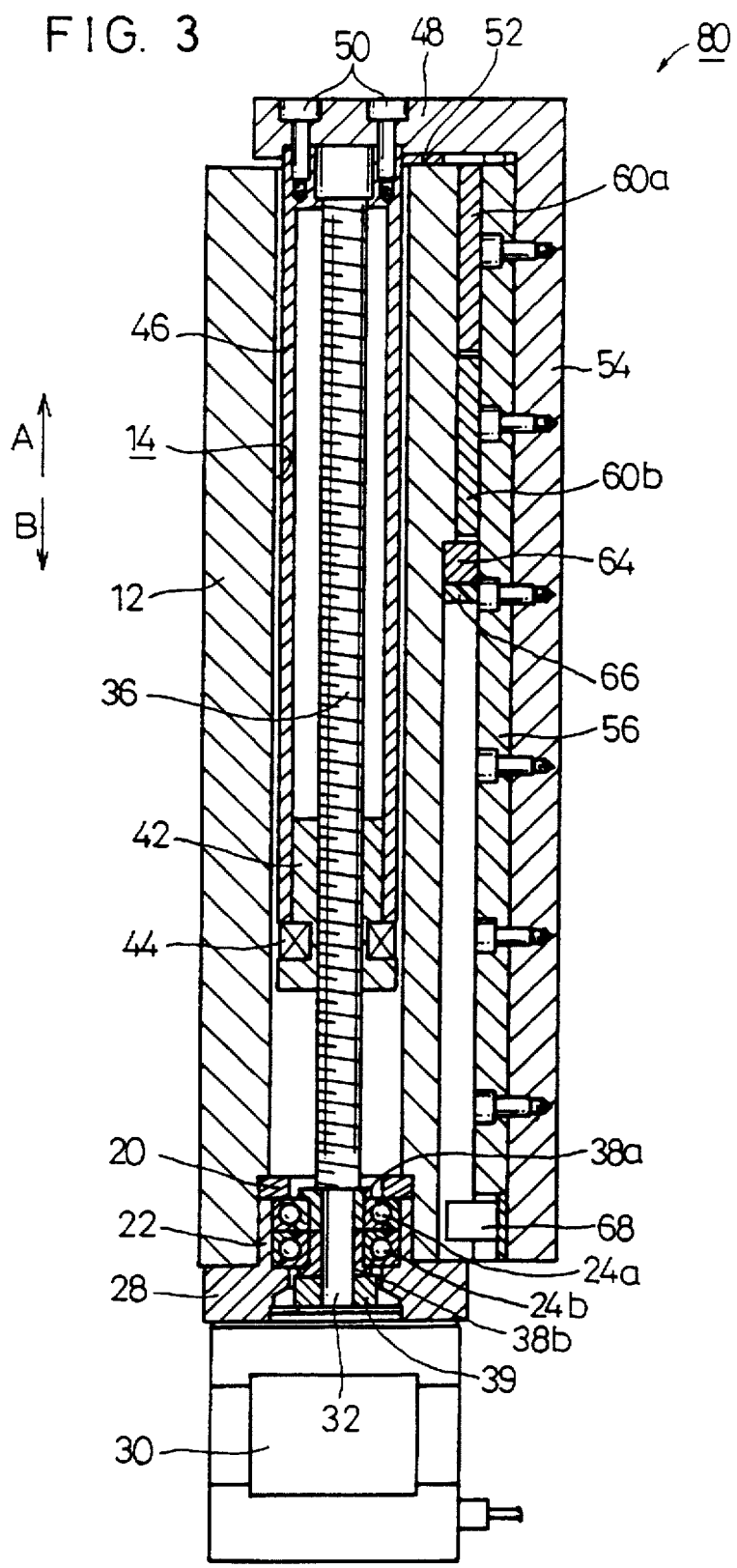

ELECTRIC ACTUATOR

BACKGROUND OF THE INVENTION

1. Field of the Invention

The present invention relates to an electric actuator comprising a main actuator body provided with a driving force-transmitting means with which rotary driving force of a motor is converted into rectilinear motion so that a displacement member is displaced in accordance with an action of the rectilinear motion in order to transport a workpiece in a vertical direction.

2. Description of the Related Art

Electric actuators have been hitherto used, for example, as means for vertically transporting workpieces. The electric actuator basically comprises a motor arranged in a body, and a feed screw as a driving force-transmitting shaft coupled to a rotary shaft of the motor. The feed screw is coaxially coupled to the rotary shaft of the motor through a coupling member. The feed screw is engaged with a feed nut, and one end of the feed nut is secured to a displacement member arranged outside the body. The electric actuator, which is constructed as described above, is operated as follows. Namely, when the motor is energized, the feed screw is rotated through the coupling member, and the feed nut is moved in an axial direction of the feed screw. As a result, the displacement member, which is secured to the feed nut, is displaced vertically.

However, the electric actuator concerning the conventional technique described above involves the following inconvenience. Namely, the conventional electric actuator has a hole defined in the body for inserting the feed nut therein. Dust or the like comes through the hole, and it adheres to the driving force-transmitting shaft. Further, the dust or the like is jammed between the feed nut and the driving force-transmitting shaft, as the electric actuator is operated and used. As a result, the driving force-transmitting function is deteriorated, and it becomes impossible to smoothly displace the displacement member.

SUMMARY OF THE INVENTION

A general object of the present invention is to provide an electric actuator which makes it possible to prevent a driving force-transmitting shaft from adhesion of dust or the like and eliminate any fear for deterioration of driving force-transmitting function.

A principal object of the present invention is to provide an electric actuator for converting rotational motion of a motor into rectilinear motion by the aid of a driving force-transmitting shaft having a straight configuration and extending in a vertical direction, and displacing a displacement member in the vertical direction in accordance with an action of the rectilinear motion, the electric actuator comprising a converting means for converting rotational motion of the driving force-transmitting shaft into the rectilinear motion, wherein the converting means is provided with a cylinder member, the driving force-transmitting shaft is surrounded by the cylinder member, and one end of the cylinder member is secured to the displacement member, so that the driving force-transmitting shaft is prevented from adhesion of dust or the like.

Another object of the present invention is to provide an electric actuator wherein the driving force-transmitting shaft comprises a feed screw, and the converting means comprises a feed nut to be engaged with the feed screw, so that the electric actuator has a simple arrangement, making it possible to avoid any fear for adhesion of dust or the like to the feed screw and the feed nut.

Still another object of the present invention is to provide an electric actuator wherein the displacement member is provided with a guide member in parallel to the feed screw, so that the displacement member is prevented from rotation which would be otherwise caused by rotation of the motor.

Still another object of the present invention is to provide an electric actuator wherein the driving force-transmitting shaft is provided with an angular contact ball bearing to support a load on the displacement member in an axial direction of the driving force-transmitting shaft.

Still another object of the present invention is to provide an electric actuator wherein the main actuator body, the cylinder member, and the displacement member are formed of aluminum or synthetic resin, so that the electric actuator has a light weight, and the load on the motor is reduced.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 shows a vertical cross-sectional view illustrating an electric actuator according to a second embodiment of the present invention.

DESCRIPTION OF THE PREFERRED EMBODIMENTS

Figure 1:
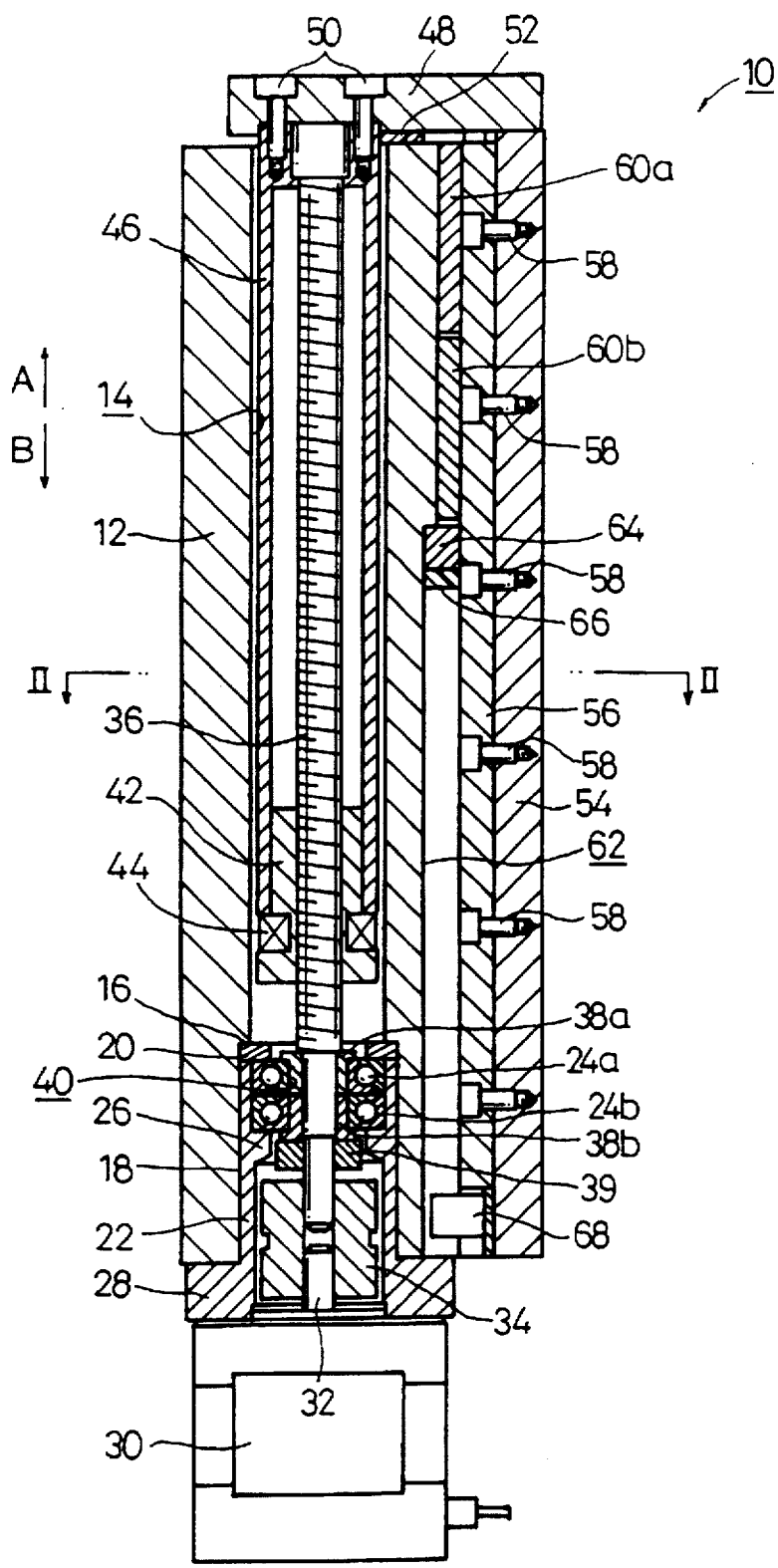
FIG. 1 shows a vertical cross-sectional view illustrating an electric actuator according to an embodiment of the present invention.

At first, an electric actuator according to a first embodiment will be explained. As shown in FIG. 1, the electric actuator 10 comprises a lengthy body (main actuator body) 12 arranged to extend in the vertical direction. A hole 14 is defined in the body 12 along its longitudinal direction. The hole 14 communicates with an expanded section 18 having an enlarged diameter through a stepped section 16. A ring member 20 is secured to the stepped section 16. A cylindrical attachment member 22 is inserted at a position under the ring member 20. Angular contact ball bearings 24a, 24b are inserted into the inside of the attachment member 22. The angular contact ball bearings 24a 24b are interposed and held, at their outer surfaces, by the ring member 20 and an inwardly protruding flange 26 formed on the attachment member 22. A radially outwardly protruding flange 28 is formed at the end of the attachment member 22. The expanded section 18 having the enlarged diameter is closed by the flange 28.

A motor 30, for example, a stepping motor or an AC servo motor is secured to the attachment member 22. A feed screw 36 to serve as a driving force-transmitting shaft is coaxially coupled to a rotary shaft 32 of the motor 30 through a coupling member 34. Namely, the feed screw 36 is arranged inside the hole 14 so that it extends in the vertical direction. Ring-shaped attachment members 38a, 38b, on which flanges are formed, are fastened to the feed screw 36 by means of a lock nut 39. In fact, as easily and clearly understood from FIG. 1, the attachment members 38a, 38b are inserted into a space 40 between the feed screw 36 and the angular contact ball bearings 24a, 24b, and the feed screw 36 is supported in its axial direction by the angular contact ball bearings 24a, 24b. A feed nut 42 is engaged with the feed screw 36. The feed nut 42 functions as a converting means for converting rotational motion of the feed screw 36 into rectilinear motion. A sensor 44 (magnet), which is formed to have a ring-shaped configuration and used for positional detection, is provided on a part of the outer circumference of the feed nut 42.

A cylindrical and lengthy cylinder member 46 is inserted into the hole 14. The cylinder member 46 surrounds the feed screw 36. The cylinder member 46 is composed of, for example, aluminum or synthetic resin, one end of which is held by the feed nut 42. The other end of the cylinder member 46 is exposed to the outside of the body 12 through one opening of the hole 14. A plate-shaped bracket (displacement member) 48 is secured to the other end of the cylinder member 46 by means of screws 50. A damper 52 is secured to the bracket 48 on a side of the body 12. The damper 52 functions to absorb the shock to the body 12 when the feed screw 36 arrives at its most retracted state.

A lengthy and plate-shaped slide table 54 is connected to the bracket 48. The bracket 48 and the slide table 54 may be formed of a material such as aluminum. However, for example, when they are formed of synthetic resin such as polyimide resin and polyacetal, they have light weights, and thus it is possible to relieve the load on the motor 30. The body 12 or other components may be formed of aluminum or synthetic resin. A rail member 56 is secured to the slide table 54 along its longitudinal direction by means of screws 58 on a surface of the slide table 54 opposing to the body 12. A stopper 68 is provided at an end of the rail member 56. Guide members 60a, 60b for slidably engaging the rail member 56 are secured to the body 12. Therefore, a guide means is constructed by the rail member 56 and the guide members 60a, 60b.

A groove 62 extends from a position at which the one guide member 60b terminates toward the motor 30, along a surface of the body 12 opposing to the slide table 54. A damper 66 is secured to a starting end of the groove 62 through an attachment member 64. The damper 66 abuts against the stopper 68 and absorbs the shock to the body 12 when the slide table 54 is displaced most upward.

Figure 2:
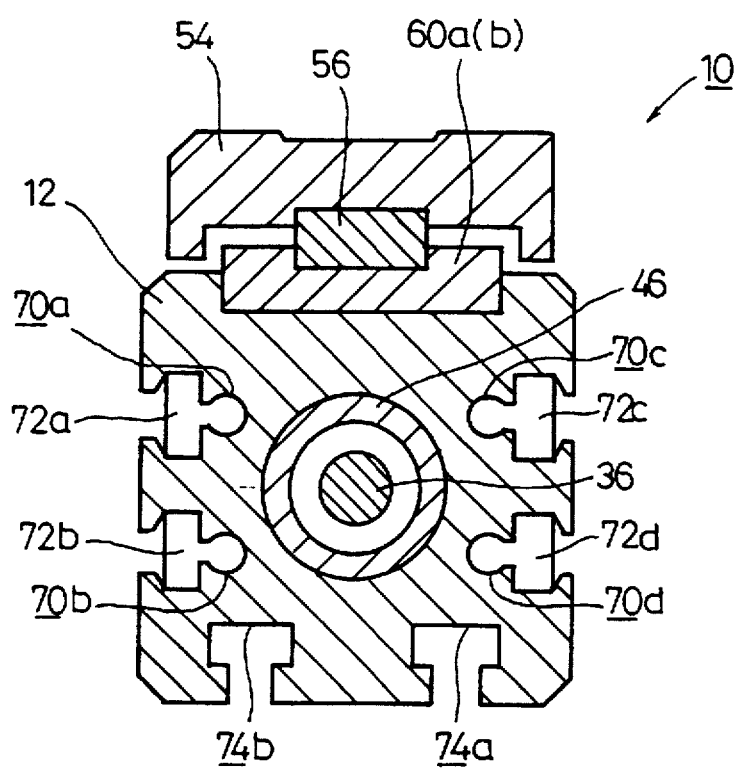
FIG. 2 shows a cross-sectional view of the electric actuator shown in FIG. 1, taken along a line II—II in FIG. 1.

As shown in FIG. 2, grooves 70a to 70d are formed along side surfaces of the body 12. Magnetic detection switches 72a to 72d are provided at predetermined positions in the grooves 70a to 70d. Grooves 74a, 74b having substantially T-shaped cross sections are defined along one side surface of the body 12. An unillustrated attachment member or the like is engaged with the grooves 74a, 74b so that the electric actuator 10 is attached to an apparatus for production or the like for the purpose of use.

The electric actuator 10 according to the first embodiment is basically constructed as described above. Next, its operation will be explained.

When the motor 30 is driven by energizing an unillustrated power source, the feed screw 36 is rotated through the coupling member 34. Accordingly, the rotational motion of the motor 30 is converted into the rectilinear motion by the aid of the engagement between the feed screw 36 and the feed nut 42. Thus the feed nut 42 is displaced in a direction of an arrow A. As a result, the slide table 54 is moved in the direction of the arrow A along the guide members 60a, 60b in accordance with the rotation of the motor 30. In this embodiment, the open end of the hole 14 is closed by the cylinder member 46. Further, the feed screw 36 is surrounded by the cylinder member 46, and it is not exposed to the outside. Therefore, the feed screw 36 can be prevented from adhesion of dust or the like.

A force is applied to the bracket 48 in a direction to make rotation in accordance with the rotation of the motor 30. However, the bracket 48 is prevented from rotation, by the aid of the rail member 56 and the guide members 60a, 60b.

During the displacement process of the cylinder member 46 in the direction of the arrow A, the stopper 68 abuts against the damper 66, and thus the terminal position after displacement of the bracket 48 is regulated. Moreover, the damper 66 absorbs the shock brought about when the stopper 68 makes abutment.

On the other hand, when the motor 30 is rotated in a direction opposite to that described above by operating an unillustrated switching means, the cylinder member 46 is moved in a direction of an arrow B. In this process, the damper 52 abuts against the end of the body 12, and thus the terminal position of the bracket 48 is regulated. Further, the damper 52 absorbs the shock brought about when the bracket 48 abuts against the body 12.

According to the first embodiment, the driving force-transmitting shaft is surrounded by the cylinder member, and hence the driving force-transmitting shaft is free from adhesion of dust or the like. Therefore, there is no fear for deterioration of the driving force-transmitting function, which would be otherwise caused by dust or the like jammed between the components. Further, the guide means prevents the displacement member from rotation which would be otherwise caused by rotation of the motor. Accordingly, the electric actuator can function to transport a workpiece in a stable manner, and it is maintained and cared with ease. Moreover, the slide table is connected to the displacement member, and thus an effect is also obtained in that a workpiece can be easily transported.

FIG. 3 shows an electric actuator 80 according to a second embodiment. In this embodiment, the same constitutive components or parts as those of the electric actuator 10 according to the first embodiment are designated by the same reference numerals, detailed explanation of which will be omitted. In the first embodiment, the rotary shaft 32 of the motor 30 is coupled to the feed screw 36 through the coupling member 34. However, in the second embodiment, the rotary shaft 32 of the motor 30 and the feed screw 36 are integrated into one unit. Therefore, it is possible to decrease the number of parts and reduce the production cost. The number of parts can be further decreased by integrating the bracket 48 and the slide table 54 into one unit.

An unillustrated photomicroswitch, which includes a light-emitting section and a light-receiving section to function as a sensor for making return to the home position of the cylinder member 46, may be secured to the attachment member 22. On the other hand, an unillustrated plate-shaped member may be secured to the feed nut 42. In this arrangement, the home position of the cylinder member 46 can be detected by displacing and inserting the plate-shaped member into a gap between the light-emitting section and the light receiving section of the photomicroswitch.

Further, an unillustrated electromagnetic brake may be provided at the end of the feed screw 36. In this arrangement, the velocity of movement of the slide table 54 can be controlled, if necessary.

What is claimed is:

1. An electric actuator for converting rotational motion of a motor into rectilinear motion, comprising:

a driving force-transmitting shaft having a straight configuration and extending in a vertical direction;

a displacement member displaceable in said vertical direction in accordance with an action of said rectilinear motion;

a slide table connected to said displacement member at one end of said slide table;

a rail member attached to said slide table and displaceable with said slide table, said rail member extending along said slide table substantially from said one end to another end thereof, said rail member being disposed in parallel to said driving force-transmitting shaft;

a main actuator body including a hole defined therein, said driving force-transmitting shaft accommodated inside said hole;

at least one guide member fixedly attached to an end of said main actuator body, said rail member being slidable along said at least one guide member;

a converting means for converting rotational motion of said driving force-transmitting shaft into said rectilinear motion;

a cylinder member provided on said converting means, for surrounding said driving force-transmitting shaft, said cylinder member being secured at its one end to said displacement member; and a bearing for supporting said driving force-transmitting shaft in its axial direction, wherein said guide member and said rail member are configured to prevent rotation of said displacement member which would otherwise be caused by rotation of said motor.

2. The electric actuator according to claim 1, wherein:

said driving force-transmitting shaft comprises a feed screw; and said converting means comprises a feed nut to be engaged with said feed screw.

3. The electric actuator according to claim 1, wherein said displacement member and said slide table are formed of aluminum or synthetic resin.

4. The electric actuator according to claim 1, wherein said driving force-transmitting shaft is integrated with a rotary shaft of said motor.

5. The electric actuator according to claim 1, wherein said bearing comprises angular contact ball bearings.

6. The electric actuator according to claim 1, wherein said cylinder member is formed of aluminum or synthetic resin.

7. The electric actuator according to claim 1, wherein said main actuator body is formed of aluminum or synthetic resin.

8. An electric actuator for converting rotational motion of a motor into rectilinear motion, comprising:

a driving force-transmitting shaft having a straight configuration and extending in a vertical direction;

a displacement member displaceable in said vertical direction in accordance with an action of said rectilinear motion;

a slide table connected to said displacement member at one end of said slide table;

a rail member attached to said slide table and displaceable with said slide table, said rail member extending along said slide table substantially from said one end to another end thereof, said rail member being disposed in parallel to said driving force-transmitting shaft;

a main actuator body including a hole defined therein, said driving force-transmitting shaft accommodated inside said hole;

at least one guide member fixedly attached to an end of said main actuator body, said rail member being slidable along said at least one guide member;

a converter configured to convert rotational motion of said driving force-transmitting shaft into said rectilinear motion;

a cylinder member provided on said converter, for surrounding said driving force-transmitting shaft, said cylinder member being secured at its one end to said displacement member; and a bearing for supporting said driving force-transmitting shaft in its axial direction, wherein said guide member and said rail member are configured to prevent rotation of said displacement member which would otherwise be caused by rotation of said motor.

9. The electric actuator according to claim 8, wherein:

said driving force-transmitting shaft comprises a feed screw; and said converting means comprises a feed nut to be engaged with said feed screw.

10. The electric actuator according to claim 8, wherein said displacement member and said slide table are formed of aluminum or synthetic resin.

11. The electric actuator according to claim 8, wherein said driving force-transmitting shaft is integrated with a rotary shaft of said motor.

12. The electric actuator according to claim 8, wherein said bearing comprises angular contact ball bearings.

13. The electric actuator according to claim 8, wherein said cylinder member is formed of aluminum or synthetic resin.

14. The electric actuator according to claim 8, wherein said main actuator body is formed of aluminum or synthetic resin.

* * * * *